United States Patent Office 2,712,774
Patented July 12, 1955

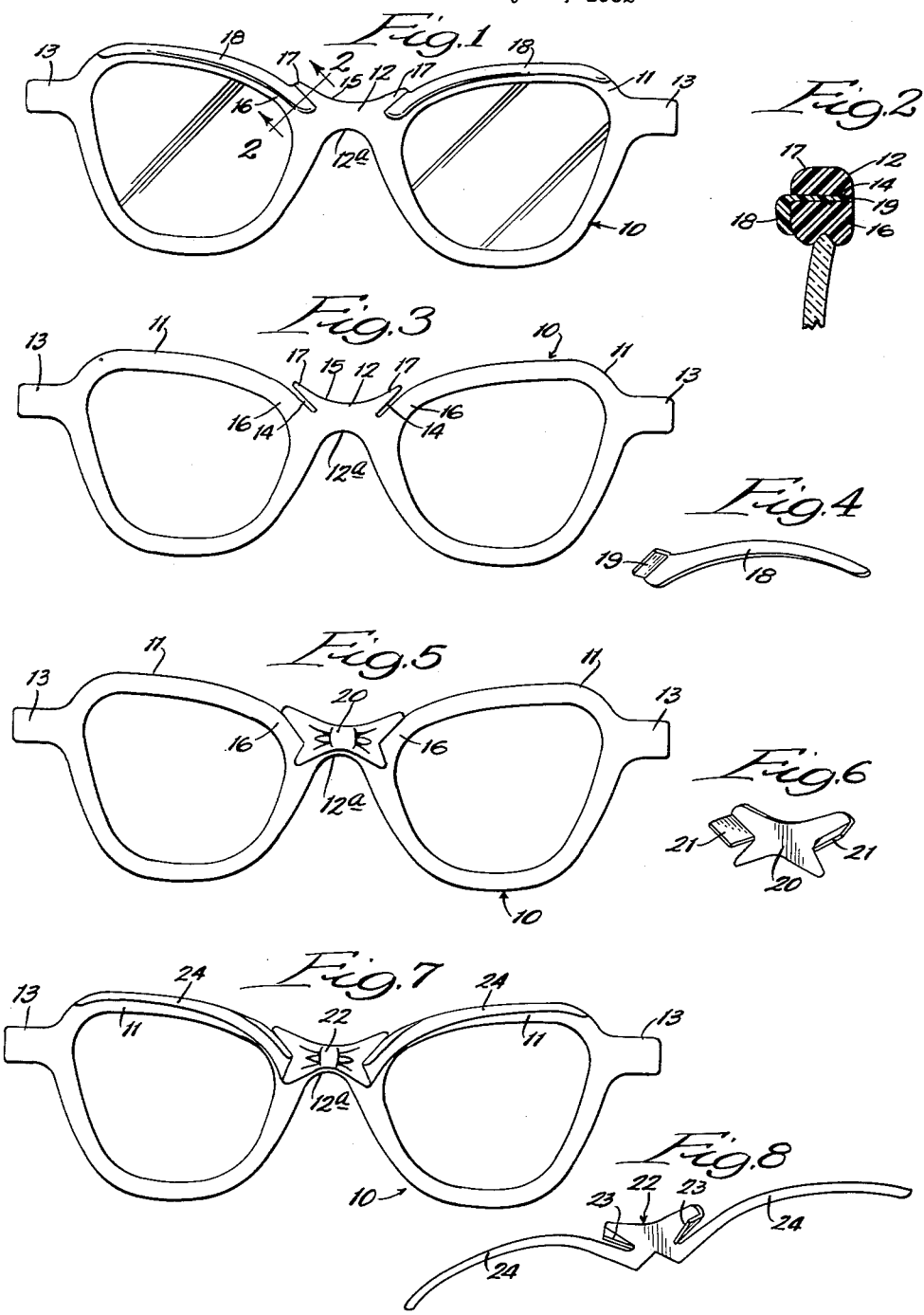

2,712,774

PLASTIC EYEGLASS FRAME AND METHOD OF FORMING SAME

Austin B. Belgard, Evanston, Ill.

Application July 31, 1952, Serial No. 301,816

8 Claims. (Cl. 88—41)

This invention relates to a plastic eyeglass frame and to a method of forming the same. More particularly, the invention relates to an eyeglass frame which is less susceptible to distortion when the lenses are inserted, while at the same time providing an attractive design and means for retention of ornamental plaques, etc.

In a plastic eyeglass frame, one of the most serious problems has had to do with the stretching unduly of the lens rims when the rims are being extended to receive the lens. The heated rim under the influence of tension or pressure tends to become attenuated at points which gives the rim an unsightly appearance and very substantially weakens it. Since the bridge or nose arch portion of the frame forms a relatively thick and unyielding central portion, the stretching has to occur at other points about the lens rim, and this results in a tendency for the rim to unduly stretch at certain points of the rim.

An object of the present invention is to provide a frame structure which overcomes the above difficulty and greatly extends the length of the lens rim so that relatively even stretching of the rim can be brought about without attenuation thereof at one or more points. A further object is to provide a frame structure which overcomes the difficulties described above while providing a crown above the nose arch giving not only an ornamental effect but also providing means for attachment of plaques to the frame. A still further object is to provide a glass frame having slits or slots therein adapted to retain ornamental plaques for examination upon the face of the wearer. Yet another object is to provide in such a structure plastic or plastic-equipped plaques which may be integrated with the plastic frame through the use of solvents, etc., the plaques serving to increase the strength of the frame in the bridge area. A still further object is to provide a plastic frame with inwardly- and downwardly-tapering slits or slots defining extensions of the top portion of the lens rims while providing a retaining crown thereabove, the crown portion being integrated again with the frame structure through the use of solvents, heat, etc., after the insertion of the lens or after plastic or plastic-equipped plaques have been secured in place about said crown. Other specific objects and advantages will appear as the specification proceeds.

The invention is shown, in an illustrative embodiment, by the accompanying drawing, in which—

Figure 1 is a front elevational view of a plastic eyeglass frame embodying my invention; Fig. 2, an enlarged broken detail sectional view, the section being taken as indicated at line 2—2 of Fig. 1; Fig. 3, a front elevational view of the lens frame provided with inwardly- and downwardly-extending slots in the bridge area of the frame; Fig. 4, a perspective view of a decorated plaque having a tab adapted to be received within one of the slots of the frame structure shown in Fig. 3; Fig. 5, a front elevational view of the frame structure shown in Fig. 3 but with a plaque secured over the bridge portion of the frame; Fig. 6, a perspective view of the plaque shown in Fig. 5, the plaque having tabs adapted to be received within the slots of the frame; Fig. 7, a view similar to Fig. 5 but showing a modified form of plaque; and Fig. 8, a perspective view of the plaque employed in the structure shown in Fig. 7.

In the illustration given, 10 designates a frame formed of plastic material such as cellulose acetate, vinyl resins, methacrylate plastic and other well-known materials. Since such materials are well known in the industry, a further listing is believed unnecessary. The plastic frame 10 may be of any suitable shape or design. In the illustration given, 11 designates the lens rims and 12 designates an integral bridge connecting the rims and providing a nose arch 12a. Endpieces 13 extend laterally from the rims, providing supports for the temples.

As above pointed out, the bridge portion of a plastic eyeglass frame is a relatively thick portion and during the stretching of the lens rim for receiving the lens, the bridge portion is substantially unyielding. This results in concentrating the stretching of the rim along a relatively small area and the above described attenuation of the rim, particularly along the top portion of the rim, results.

I have discovered that the above difficulty can be overcome by providing the bridge 12 with slits or slots 14 which extend downwardly and inwardly, leaving a raised crown portion 15 there-above. The slits 14 may be very thin, amounting to nothing more than knife cuts, or, if desired, substantial slots may be formed which space the crown portion 15 visually from the rim portion.

The slits or slots 14 are preferably so formed as to define an extended rim portion 16, which is virtually a continuation of the top rim portion 11. I prefer that the extension 16 be substantially of the same cross-section as the top rim portion 11, so as thus to increase the length of the rim portion. Thus in the stretching of the rim to receive the lens, it is found that stretching may occur as readily in the area 16 as in the top portion of the rim 11, and as a result a rather uniform stretching occurs without undue stretching of any portion at the top of the rim.

The crown 15 serves several useful purposes. In the first place, after the lenses have been inserted, the crown portion 15 may be again united to the portion 16 of the rim by applying solvent, heating, etc., and this results in giving greater rigidity to the frame at the ridge portion. In addition, the crown 15 provides slots for receiving plaques or tabs or flanges carried by the plaques so that while the frame is upon the face of the wearer, various types of plaques may be removably supported upon the frame to determine the effect thereof. Further, the crown has laterally- and upwardly-extending arms 17 which enclose plastic flanges or tabs of the plaque, enabling them to be cemented or fused through the use of solvent, etc. into an integrated bridge structure.

The plaques may be of varied shapes and types. In the illustration given in Figs. 1, 2 and 4, the plaque consists of a bar or brow plaque 18, having at its inner end a tab or flange 19 received within the slot 14 of the bridge 12.

In the structure shown in Fig. 5, the plaque comprises a central portion or bridge plaque 20, having spaced tabs or flanges 21 adapted to be received within the slots 14 for supporting the plaque in the position shown in Fig. 5.

In the structure shown in Figs. 7 and 8, the plaque 22 is provided with tabs 23 adapted to be received within the slots 14 of the frame and the central or bridge plaque portion 22 is provided with integral, laterally-extending bars or brow plaques 24 extending over the top portions of the rim 11.

The plaques may be formed entirely of plastic material or of metal with a plastic backing or inlays, etc. After the fitting operation, the plaques may be secured without the use of tabs to the front side of the frame by means of cement, etc., or by pins or other suitable means. Further, if desired, decorative plaques may be added at the ends of the frame about the temple supports 13.

While I have shown three styles of plaques for use on plastic eyeglass frames, it will be understood that these are illustrative only and that a variety of other forms of plaques may be used. All three of the plaques illustrated may be cemented in place in the articulation of the tabs and slots, after the final style has been determined and adjusted to the customer's frame. The plaques shown in Figs. 1 and 7 may also be cemented at the extremities of the brow plaques for additional rigidity. As indicated, the tabs may be omitted and the plaques secured directly to the frame by cement, the use of solvent, or by mechanical means.

In the operation of the structure, the frame is provided with the slots or slits 14 to extend the length of the top rim portion of the frame, whereby when the rims are stretched to receive the lenses, the stretching is relatively uniform over a long area and there is no concentration of the stretching at particular points to bring about an attenuation at such points. After the lenses are in place, the slits or slots may be eliminated by applying solvent, cement, etc., thereto. I prefer, however, to employ the crown and the slots to retain decorative plaques while the frame is upon the face of the wearer and various types of plaques may be examined removably in position upon the frame. After a final determination of the style has been made, several courses may be followed, the plaques may be removed, and the horns or arms 17 of the crown secured to the rims by the use of solvent, cement, etc., and plaques then applied to the front portion of the frame by the use of cement, pins, or other means. Alternatively, the plaques with plastic tabs or flanges may be secured or integrated within the slots 14 to the crown portion 15 and rim portion 16. In this way, the plaques are united substantially integrally with the eyeglass frames, while at the same time the rigidity or thickness of the bridge is increased.

While in the foregoing procedure the bridge is provided with inclined slots which seem to weaken the bridge, there is, in fact, no weakening, because the bridge remains as strong as the rim portions of the lenses. However, by the subsequent merging of the bridge arms 17 with the rim extension 16, there is provided a solid and relatively rigid bridge portion having a strength greater than that of the rims.

While in the foregoing specification I have set forth specific structures in considerable detail for the purpose of illustrating embodiments of the invention, it will be understood that such details of structure may be varied widely by those skilled in the art without departing from the spirit of my invention.

I claim:

1. In a process for inserting lenses within the rims of an eyeglass frame, the steps of providing the bridge portion of said frame with downwardly and inwardly extending slits to form an extension of the upper lens rim which is not substantially greater in cross section than said bar and will stretch equally therewith, and then stretching the rims of said frame and inserting lenses therein.

2. The process of claim 1, in which inserts are placed within the slits of said bridge portion of the frame and secured therein.

3. The process of claim 1, in which the solvent is applied to the slitted portions of said bridge to unite said portions.

4. In a process for inserting lenses within the rims of an eyeglass frame, the steps of elongating the upper rims of the eyeglass frame by providing slits within the bridge portion of the frame to form rim extensions within the bridge of substantially equal cross section to the upper rim portions, stretching the rims of said frame and inserting lenses therein, and applying cement within said slits to unite the slitted portions of the bridge.

5. In a process for securing lenses within the rims of an eyeglass frame, the steps of forming slots within the bridge portion of the frame to provide extensions of the upper rim, and inserting tabs within said slots and securing the same therein.

6. The process of claim 5, in which the tabs are secured within said slots by cement.

7. An eyeglass frame, comprising a plastic frame having lens rims connected by an integral bridge providing a nose arch, said bridge having slits extending downwardly and inwardly from the upper portion thereof to provide extensions of the upper rims, whereby when lenses are inserted within the rims, an elongated upper rim is provided for stretching.

8. An eyeglass frame, comprising a plastic frame having lens rims connected by an integral bridge providing a nose arch, said bridge having slots extending downwardly and inwardly from the upper portion thereof to provide elongations of the upper rims, a reinforcing plastic flange within each of said slots, and means for anchoring said flanges within said slots.

References Cited in the file of this patent

UNITED STATES PATENTS

| | | |
|---|---|---|
| D. 121,563 | Bressler | July 23, 1940 |
| D. 147,475 | Schwartz | Sept. 9, 1947 |